United States Patent Office 3,761,357
Patented Sept. 25, 1973

3,761,357
BONDING OF ENZYMES TO POLYMERIC MATERIALS
Roger Epton, Brierley Hill, Staffordshire, John Vincent McLaren, Compton, Wolverhampton, and Trevor Henry Thomas, Worcester, England, assignors to Koch-Light Laboratories Limited, Colnbrook, Buckinghamshire, England
No Drawing. Filed Sept. 15, 1971, Ser. No. 180,856
Claims priority, application Great Britain, Sept. 17, 1970, 44,515/70
Int. Cl. C07g 7/02
U.S. Cl. 195—63
10 Claims

ABSTRACT OF THE DISCLOSURE

A hydrophilic water insoluble enzyme polymer is prepared by bonding an enzyme to aldehyde groups on a polymer having along its backbone additional repeating pendant side groups comprising predominately aliphatic dimethyl acetal groups or a combination of aliphatic dimethyl acetal groups and primary amide groups.

---

This invention relates to the bonding of enzymes to polymeric materials and is particularly concerned with polymeric materials to which enzyme molecules have been bonded to render them insoluble and to certain polymeric materials to which enzymes can be bonded.

BACKGROUND TO THE INVENTION

Enzymes are normally soluble in water and when they are used to catalyse reactions occurring in aqueous solutions, their recovery is often difficult and expensive and may not be an economic proposition. In some cases it may be necessary to remove the enzyme from the product and even its destructive separtion may be a tedious procedure.

One way of overcoming this difficulty is to bond the enzyme molecules covalently to a water-insoluble polymer since the enzyme can then be filtered off from an aqueous reaction medium and re-used if desired. Care must be taken, however, to ensure that this covalent bonding does not destroy or deleteriously modify the catalytic activity of the enzyme.

For best results, the water-insoluble polymer should have an overall hydrophilic nature so that it can mix intimately with aqueous chemical reactants. Also, for convenience, the enzyme molecules should be capable of bonding directly to groupings on the polymer chain without activation of those groupings immediately prior to bonding. Further, it would be an advantage in many instances for the polymer to be such that, when the bound enzyme has become partially or totally denatured, the level of enzyme activity could be boosted by coupling fresh enzyme.

The invention has, therefore, been made with these points in mind.

THE INVENTION

According to the invention there is provided a hydrophilic water-insoluble enzyme polymer capable of swelling when in contact with water having a molecular backbone chain with pendant repeating side chains bearing aldehyde groups, the side chains being such that sequential condensation of neighbouring aldehyde groups to give an extended polyacetal is restricted, at least some of the aldehyde side groups having attached to them enzyme molecules, the polymer with attached enzymes being water insoluble and capable of acting as an enzyme catalyst.

The enzyme molecules in such materials make excellent catalysts and are particularly useful for catalysing reactions effected in aqueous solutions since the insoluble materials can be simply filtered off from the product and if required re-used.

Additionally, the enzyme molecules can be bonded directly to the aldehyde groupings without any activation immediately prior to bonding and the resultant covalent links hold the enzyme molecules to the polymer. However, in certain cases it is possible to boost the level of enzyme activity when denaturation causes the bound enzyme activity to drop. Bound enzyme may be detached by repeated washing with a macromolecular enzyme substrate. Alternatively, the carrier surface may be reactivated for coupling fresh enzyme by treatment with dilute mineral acid although in this case enzyme protein is not detached.

The polymer preferably has other repeating functional side groupings than the aldehyde groupings, these functional side groupings serving to increase the hydrophilic nature of the polymer. It is found that, for best results in binding enzymes to the polymer, the polymer should have a comparatively large degree of swelling when contacted with water.

We have also found, according to another aspect of the invention, that one suitable group of polymers are those hydrophilic water-insoluble polymers capable of swelling when in contact with water, having along its molecular backbone chain pendant repeating side chains bearing aldehyde groups to which enzyme molecules can be attached, the molecular backbone chains also carrying other repeating side groupings which increase the hydrophilic nature of the polymer, the said other repeating functional side groupings being predominantly aliphatic dimethyl acetal groupings or a combination of these groupings and primary amide groupings, the side chains bearing the aldehyde groups being such that sequential condensation of neighbouring aldehyde groups is to give an extended polyacetal is restricted. In most instances, the polymer can be made water-insoluble by incorporation of covalent cross-links between a number of polymer chains.

The aliphatic dimethyl acetal side groupings can be derived from N-acryloylaminoacetaldehyde dimethyl acetal although other monomers such as 2-N-acryloylaminopropionaldehyde dimethyl acetal and acryloyloxyacetaldehyde dimethyl acetal can be used. The acryloyloxy- and acryloylamino-aldehyde dimethyl acetals might also be replaced by other unsaturated acyl derivatives of the hydroxy- and amino-acetaldehyde dimethyl acetals, for example methacryloyl and crotonyl derivatives might be used.

The primary amide side groupings can, for example, be derived from acrylamide although other monomers calculated to contribute to the overall hydrophilic character of the polymer such as, for example, methacrylamide or acrylic acid, can be used.

The cross-linking can be achieved in any convenient way, for example, with N,N[1]-methylene-bis-acrylamide, diallyl ether or divinyl benzene.

The repeating aldehyde side groups can be introduced by mild acid hydrolysis of dimethyl acetal groupings on the polymer although the aldehyde side groups could also be derived from other acetal groups such as, for example, diethyl acetal groups.

Polymers according to this invention can readily have enzyme molecules coupled to their aldehyde side groupings and the resulting polymer-enzyme conjugates are insoluble in water. A proportion of the enzyme molecules coupled to the polymers retain their biological activity and can still be used as specific catalysts. When enzymic catalysis is complete the water-insoluble polymer/enzyme conjugate can be easily removed from the reaction products, for example, by filtration and re-used repeatedly. The particulate polymer/enzyme conjugates can be used as the active fill of a column through which the substrate solution is perfused, or, alternatively, maintained suspended in dynamic equilibrium by an upward flow of substrate solution in a fluidized bed reactor.

As well as being prepared in particulate form, the polymers with the enzyme molecules attached can be provided in any convenient form, for example, sheets, coatings, and also impregnated within the pores of various support materials.

In addition to enzymes, the polymers according to the invention can be used to couple other organic species, such as for example, proteins and amino acids.

An important advantage of this invention is that, when the enzymes have been made water insoluble by bonding to the polymer, they often have improved stability over the free enzyme in solution.

The polymers with attached enzymes according to the invention are readily prepared because the enzymes can be readily and simply attached to the aldehyde side groupings. Chemical coupling of the enzyme or other organic species can be achieved by dissolution in aqueous buffer, adding the polymer, and allowing the resulting reaction to proceed over some hours with stirring. The primary amino groups of the enzyme or organic species readily couple to the aldehyde groups on the polymer.

Examples of enzymes which can be joined to the polymers are α-amylase, papain, trypsin and urease.

Copolymers of N-acrylolyaminoacetaldehyde dimethyl acetal and N,N$^1$-methylene-bis-acrylamide can be prepared by dissolving the monomers in aqueous solution and, after purging with nitrogen, adding a catalyst such as potassium persulphate. However, persulphate with riboflavin and photoflood light give the best results. Aldehyde groups can be generated on the polymer by treatment with dilute acid. The ratio of N-acryloylaminoacetaldehyde dimethyl acetal and N,N$^1$-methylene-bis-acrylamide can be varied from 200/1 to 1/5. However a convenient ratio, ensuring mechanical stability and maximal incorporation of monomers is 8/1. Large scale preparation of the polymer can be achieved by preparing N-acryloylaminoacetaldehyde dimethylacetal as a solution in tetrahydrofuran (rather than ether), filtering off aminoacetaldehyde dimethylacetal hydrochloride, mixing the tetrahydrofuran with water containing persulphate and riboflavin, purging with nitrogen, and irradiating with a No. 2 photoflood immediately the viscosity of the mixture starts to increase.

By controlling the conditions of acidic hydrolysis polymers with different aldehyde contents and different swelling properties can be prepared. This is important because the ability of a polymer to bind enzyme is often related to its swelling properties.

Copolymers of N-acryloylaminoacetaldehyde dimethyl acetal, acrylamide and N,N$^1$-methylene-bis-acrylamide can also be prepared in which the ratio of the first two monomers, with respect to each other, is infinitely variable. Aldehyde groups can be generated by dilute acid treatment. In certain circumstances incorporation of acrylamide in the polymer may be desirable since this leads to a reduction in the overall cost.

N-acryloylaminoacetaldehyde dimethyl acetal monomer alone can be polymerized, in aqueous solution, by the action of, for example, potassium persulphate. The resulting water-soluble polymer may be transformed into a completely water-insoluble powder by freeze-drying from aqueous solution. Aldehyde groups can then be generated on the polymer by dilute acid treatment, the polymer remaining water-insoluble.

Sheets and coatings of the above copolymers and polymers may be obtained by applying the monomers either alone or in solution to a suitable surface, for example glass, and polymerising by the action of moderate heat.

Impregnation of the copolymers within a porous support such as filter paper can be achieved by dipping papers impregnated with, for example, potassium persulphate into an aqueous solution of the appropriate monomers followed by polymerization of the monomers absorbed by the porous support in situ.

PREFERRED EMBODIMENT OF THE INVENTION

The invention will now be illustrated with reference to the following examples.

EXAMPLE 1

Preparation of N-acryloylaminoacetaldehyde dimethyl acetal

Freshly distilled aminoacetaldehyde dimethyl acetal (25.2 g., 0.24 mole) was mixed with dry, peroxide free ether (200 ml.). The reaction vessel was cooled in an ice water bath and acryloyl chloride (10.8 g., 0.12 mole) added dropwise over 30 minutes with stirring. After a further 30 minutes the white solid which separated was filtered off. The ethereal solution was evaporated under reduced pressure at room temperature yielding N-acryloylaminoacetaldehyde dimethyl acetal as an oil. The yield was 86.5% (based on acryloyl chloride) and the boiling point 104 to 105° at 0.05 to 0.1 mm. pressure.

Preparation of copolymer of N-acryloylaminoacetaldehyde dimethyl acetal (I) and N,N$^1$-methylene-bis-acrylamide (II): molar ratio I/II of 8/1

Acryloylaminoacetaldehyde dimethylacetal (10.24 g., 0.064 mole) and N,N$^1$-methylene-bis-acrylamide (1.28 g., 0.008 mole) were dissolved in distilled water (40 ml.) and nitrogen passed through the solution for 0.5 hour. A trace of riboflavin and potassium persulphate were added and the solution irradiated with a No. 2 photoflood for 10 minutes. Polymerization rapidly occurred to give a block of cross-linked gel which was afterwards ground in a mortar and washed with first water (2×500 ml.), ethanol (2×400 ml.) and then ether (2×300 ml.). Finally, the polymer (Copolymer A) was dried under reduced pressure.

Preparation of copolymers of N-acryloylaminoacetaldehyde dimethylacetal (I) and N,N$^1$-methylene-bis-acrylamide (II) in which the monomer ratios varied Using broadly the procedure of the previous experiment copolymers were prepared in which the ratio of monomer (I/II) varies from 200/1 to 1/5. The properties of these copolymers in water are summarised in Table 1.

TABLE 1.—PHYSICAL NATURE OF COPOLYMERS OF N-ACRYLOYLAMINOACETALDEHYDE DIMETHYL ACTAL (I) AND N,N$^1$-METHYLENE-BIS ACRYLAMIDE

| | Molar ratio (I/II) | | |
|---|---|---|---|
| | 200/1 | 100/1 | 50/1 |
| Physical form of polymer | Rubbery, jelly, sticky | Rubbery, jelly, sticky | Hard and rubbery. |

| | 20/1 | 8/1 | 5/1 | 2/1 | 1/2 | 1/5 |
|---|---|---|---|---|---|---|
| Physical form of polymer | Hard and brittle | Hard and brittle | Firm | Soft | Soft | Very soft. |

Generation of aldehyde groups on Copolymer A

Aldehyde groups were generated by shaking Copolymer A in suspension in hydrochloric and (2 N) at 25° from between 15 minutes and 48 hours. The primary aldehyde content of the resulting copolymer (Copolymer B) reached a maximum value of approx. $5.0 \times 10^{-3}$ mole/g. of polymer after ½ hour. It was found, however, that longer acid treatment served to increase the swelling properties of the polymer and gave a polymer to which enzyme molecules could be bonded better.

Copolymer B could also be generated from Copolymer A with weaker (0.25 N) hydrochloric acid when both maximal aldehyde content and maximum swelling was approached after 48 hours.

EXAMPLE 2

Preparation of copolymer of N-acryloydaminoacetaldehyde dimethylacetal (I) and N,N¹-methylene-bis-acrylamide (II), starting from aminoacetaldehyde and avoiding isolation of the monomer (I)

Aminoacetaldehyde dimethylacetal (420 g., 4 mole) was mixed with peroxide free tetrahydrofuran (500 ml.) and cooled to 0° in an ice-salt bath, with stirring. A mixture of acryloyl chloride (160 ml., 2 mole) and tetrahydrofuran (250 ml.) was added dropwise, with stirring, at such a rate that the temperature did not exceed 15°. After a further 20 min. stirring, the mixture was rapidly filtered, and the white solid washed with more tetrahydrofuran (100 ml.). To the combined filtrate and washings, N,N¹-methylene-bis-acrylamide (38.4 g., 0.3 mole) was added, followed by a solution of potassium persulphate (360 mg.) and riboflavin (72 mg.) in distilled water 500 ml. The mixture was transferred to a polymerisation flask and the volume adjusted to 1800 ml. by addition of more distilled water. Nitrogen was slowly passed through the mixture, when a clear solution was obtained. After approximately 45 min. the viscosity of the solution started to increase rapidly. At this point the nitrogen bleed was adjusted so that nitrogen was blowing across the surface of the mixture and the solution was irradiated with two No. 2 photoflood lamps for 15 min. After standing overnight, the resulting gel (Copolymer A¹) was broken up by grinding in a mortar and washed exhaustively with distilled water.

Generation of aldehyde groups on Copolymer A¹

Aldehyde groups were generated on Copolymer A¹ by treatment with hydrochloric acid (0.25 N) at 25° over 48 hours as described in Example 2. The resulting copolymer was identical with Copolymer B.

EXAMPLE 3

Preparation of copolymer N-acryloylaminoacetaldehyde dimethyl acetal (I), N,N¹-methylene-bis-acrylamide (II), and acrylamide (III): molar ratio I/II/III of 1/1/9

Acryloylaminoacetaldehyde dimethyl acetal (1.59 g., 0.01 mole), N,N¹-methylene-bis-acrylamide (1.54 g., 0.01 mole) and acrylamide (6.39 g., 0.09 mole) were dissolved in distilled water (100 ml.) and nitrogen passed through the solution for 0.5 hour. A trace of riboflavin and potassium persulphate were added and the solution irradiated with a No. 2 photoflood for 15 minutes when rapid polymerization occured. The resulting block of gel (Copolymer C) was ground in a mortar, washed with water (4×100 ml.), shrunk by dropwise addition of ethanol, and allowed to dry in air.

Generation of aldehyde groups on Copolymer C

Aldehyde groups were generated by shaking Copolymer C in suspension in hydrochloric acid (2 N) at 25° C. for 14 hours.

EXAMPLE 4

Preparation of polyacryloylaminoacetaldehyde dimethyl acetal

Acryloylaminoacetaldehyde dimethyl acetal (1.0 g.) was diluted to 100 ml. with distilled water and a trace of riboflavin and potassium persulphate were added. The solution was then irradiated with a No. 2 photoflood lamp for 15 minutes when the solution became very viscous. The solution was exhaustively dialysed against distilled water and polyacryloylaminoacetaldehyde dimethyl acetal (Polymer D) recovered as a water-insoluble powder by freeze-drying. The yield of Polymer D was 5.7 g. (57%).

Generation of aldehyde groups on Polymer D

Aldehyde groups were generated by stirring Polymer C with hydrochloric acid (2 N) at 25° for 8 hours.

EXAMPLE 5

Preparation of polyacryloylaminoacetaldehyde dimethyl acetal films and coatings

Acryloylaminoacetaldehyde dimethyl acetal monomer was applied to a suitable surface, for example, glass by dipping or spreading. Polymerization was effected by heating at 100° C. for 2 hours. The resulting film or coating swelled slightly in water.

Preparation of materials impregnated with Copolymer A

Filter paper was dipped in an aqueous solution (1%) of potassium persulphate and allowed to dry. The paper was then dipped in an aqueous soltuion of acryloylaminoacetaldehyde dimethyl acetal and N,N¹-methylene-bis-acrylamide in the molar ratio of 8/1 in the minimum amount of distilled water. The paper was pressed between other filter papers to remove the excess of solution and allowed to stand in a breaker over a steam-bath when polymerization occurred.

Generation of aldehyde groups in films, coatings and impregnates of copolymers and polymers involving acrylolylaminoacetaldehyde dimethyl acetal Aldehyde groups were generated by allowing the polymer impregnated materials to stand in hydrochloric acid (2 N) at room temperature for 18 hours.

EXAMPLE 6

Coupling of Copolymers B and C

Samples (100 mg.) of Copolymers B and C were weighed into stoppered tubes and allowed to swell in phosphate buffer (0.025 M, pH 7.5, 10 ml.) for one hour. The tubes were then centrifuged and the excess buffer discarded. Aliquots (0.5 ml.) of a solution of enzyme (20 mg./ml.) in phosphate buffer (0.025 m. pH 7.5) were added to each tube and reaction allowed to proceed at 0 to 5° C. with magnetic stirring for 18 hours. The copolymers, now with coupled enzyme attached, were washed either with dilute buffer (of pH close to that for maximum enzyme activity) or with a buffered solution containing a suitable macromolecular substrate. Up to eight washings were employed each of 20 minutes duration. Vigorous magnetic stirring was employed throughout the washing procedure α-amylase, trypsin, papain and urease were thus coupled to Copolymer B, and α-amylase to Copolymer C.

EXAMPLE 7

Reactivation and re-use of Copolymer B

An aliquot (4 ml.) of water-insoluble α-amylase bonded to copolymer B suspension (10 mg./ml.) prepared as in Example 5 was centrifuged and the supernatant discarded. The polymer was then washed six times with hydrochloric acid (2 N, 10 ml.). Each washing was of 30 minutes duration with vigorous magnetic stirring, these washings freeing the enzyme and regenerating aldehyde groups on the polymer. The polymer was washed with phosphate buffer (0.025 M, pH 7.5) to constant pH. The acid treated copolymer was then again coupled with α-amylase following the procedures outlined in Example 5.

EXAMPLE 8

Insolubilisation of tryspin by coupling with samples of Copolymer B of differing aldehyde contents and swelling properties Samples (150 mg.) of Copolymer B, produced by controlled hydrolysis of Copolymer A with hydrochloric acid (0.25 N), and of aldehyde content as detailed in the following Table 2, were weighed into stoppered tubes and allowed to swell in phosphate buffer (0.025 M, pH 7.5, 10 ml.) for one hour. The tubes were then centrifuged and excess buffer discarded. Aliquots (0.375 ml.) of trypsin solution (20 mg./ml.) in phosphate buffer (0.025 M, pH 7.5) were added to each tube and reaction allowed to proceed at 0 to 5° with magnetic stirring for 3 hours. The copolymers, now with trypsin attached, were washed twice with phosphate buffer (0025 M, pH 7.5), twice with casein solution (1%) in phosphate buffer, twice more with phosphate buffer, and finally suspended in the same buffer (15 ml.). Tryptic activity was measured against a solution (0.5 mM.) of benzoyl-L-arginine ethyl ester (B.A.B.B.) in phosphate buffer (0.05 M, pH 7.5). The results are presented in Table 2.

TABLE 2.—VARIATION OF TRYPTIC ACTIVITY BOUND TO SAMPLES OF COPOLYMER B WITH DIFFERING ALDEHYDE CONTENTS AND SWELLING PROPERTIES

| | Sample No. (Copolymer B) | | | |
|---|---|---|---|---|
| | 1 | 2 | 3 | 4 |
| Aldehyde content (moles CHO/g.) | $2.35 \times 10^{-3}$ | $3.27 \times 10^{-3}$ | $4.20 \times 10^{-3}$ | $4.97 \times 10^{-3}$ |
| Water regain (g. H$_2$O/g. Copolymer) | 2.2 | 1.7 | 1.0 | 2.2 |
| Tryptic activity (B.A.B.B. units[1]/g. copolymer) | $1.35 \times 10^3$ | $2.25 \times 10^3$ | $0.89 \times 10^3$ | $5.0 \times 10^3$ |

[1] One B.A.B.B. unit is that amount of trypsin which will give an optical density charge of 0.003 unit/min. at 253 mm. in 5 ml. digest at 25° and pH 7.5.

As can be seen from these examples, the invention provides a way in which enzyme molecules can be bonded to polymers and the resulting material is water soluble so that the enzyme, after catalysing a reaction can be removed from the product for re-use if required by simple filtration. Alternatively, the resulting material can be in the form of sheets or impregnated on a suitable support and the reactants brought into contact with the material.

What we claim is:

1. A hydrophilic water insoluble enzyme polymer capable of swelling when in contact with water having along the polymer backbone chain repeating pendant side chains bearing aldehyde groups, at least a portion of said aldehyde groups having enzyme molecules chemically bonded thereto by a covalent bond, said polymer further characterized as having along its backbone additional repeating pendant side groups to increase the hydrophilic property of the polymer, said additional side groups comprising predominantly aliphatic dimethyl acetal groups or a combination of aliphatic dimethyl acetal groups and primary amide groups;
   said polymer having a restricted ability for neighboring aldehyde groups to sequentially condense to produce an extended polyacetal and the ability to act as an enzyme catalyst.

2. An enzyme polymer as claimed in claim 1 in which the attached enzymes are α-amylase, papain, trypsin or urease.

3. An enzyme polymer as claimed in claim 1 in which the polymer contains covalent cross-links between polymer chains in order to confer the water-insolubility.

4. An enzyme polymer as claimed in claim 1 which has a high degree of swelling when contacted with water.

5. A process for reactivating the polymer according to claim 1 in which the polymer is treated with dilute mineral acid to remove the enzyme and then fresh enzyme molecules are attached to the polymer.

6. A hydrophilic water insoluble enzyme polymer as in claim 1 wherein said polymer is a copolymer of N-acrylolyaminoacetaldehyde dimethyl acetal and N,N'-methylene-bis-acrylamide.

7. A hydrophilic water insoluble enzyme polymer as in claim 1 wherein said polymer is a copolymer of N-acryloylaminoacetaldehyde dimethyl acetal, N,N'-methylene-bis-acrylamide and acrylamide.

8. A hydrophilic water insoluble enzyme polymer as in claim 1 wherein said polymer is homopolymer of N-acrylolyaminoacetaldehyde dimethyl acetal.

9. A hydrophilic water insoluble enzyme polymer as in claim 1 wherein the dimethyl acetal side groupings are derived from N-acrylaminoacetaldehyde dimethyl acetal, 2 - N - acrylolyaminopropionaldehyde dimethyl acetal, acryloyloxyacetaldehyde dimethyl acetal, or unsaturated acyl derivatives of hydroxy and amino acetaldehyde dimethyl acetals.

10. A hydrophilic water insoluble enzyme polymer as in claim 1 wherein the amide side groupings are derived from acrylamide, methacrylamine or acrylic acid.

References Cited

UNITED STATES PATENTS

| 3,666,733 | 5/1972 | Epton | 195—68 X |
| 3,470,135 | 9/1969 | Ishida et al. | 260—72 X |
| 3,282,702 | 11/1966 | Schreiner | 195—63 X |
| 3,117,004 | 1/1964 | McFarlane et al. | 99—48 X |
| 3,271,334 | 9/1966 | Kern et al. | 260—8 |

DAVID M. NAFF, Primary Examiner

U.S. Cl. X.R.

195—68, Dig. 11